United States Patent [19]
Wickstrom

[11] Patent Number: 5,373,662
[45] Date of Patent: Dec. 20, 1994

[54] VEGETATION STRUCTURES

[75] Inventor: Charles R. Wickstrom, Littleton, Colo.

[73] Assignee: Living Tapestries Limited Liability Company, Littleton, Colo.

[21] Appl. No.: 209,823

[22] Filed: Mar. 11, 1994

[51] Int. Cl.$^5$ ............................................. A01G 25/00
[52] U.S. Cl. .......................................... 47/82; 47/66; 47/83
[58] Field of Search ................. 47/81, 82, 62, 83, 66 S

[56] References Cited

U.S. PATENT DOCUMENTS

| | | | |
|---|---|---|---|
| 1,217,239 | 2/1917 | Swartz | 47/82 |
| 2,113,523 | 8/1937 | White | |
| 2,121,173 | 4/1938 | MacPherson | |
| 2,279,735 | 5/1938 | Gates | |
| 3,869,829 | 3/1975 | Chiosso | 47/82 |
| 4,255,896 | 3/1981 | Carl | 47/62 |
| 4,268,994 | 5/1981 | Urai | |
| 4,295,296 | 10/1981 | Kinghorn | 47/82 |
| 4,313,278 | 2/1982 | Pointing et al. | 47/82 |
| 4,603,506 | 8/1986 | Powell, Jr. | 47/62 |
| 4,704,818 | 11/1987 | Cameron | 47/82 |

FOREIGN PATENT DOCUMENTS

| | | | |
|---|---|---|---|
| 2636917 | 2/1978 | Germany | 47/82 |
| 2730279 | 1/1979 | Germany | 47/82 |
| 1486553 | 9/1977 | United Kingdom | 47/82 |

*Primary Examiner*—Michael Powell Buiz
*Assistant Examiner*—Joanne C. Downs
*Attorney, Agent, or Firm*—Klass, Law, O'Meara & Malkin

[57] ABSTRACT

A decorative wall formed from a plurality of modules wherein each module has a closed framework forming an opening in which a compost unit is located and wherein the closed framework has conduits located therein with couplings for permitting the passage of a fluid therethrough with at least one coupling of each module being connected to one coupling of another module and a soaker hose connected to one of the conduits to provide fluids to the compost unit.

20 Claims, 2 Drawing Sheets

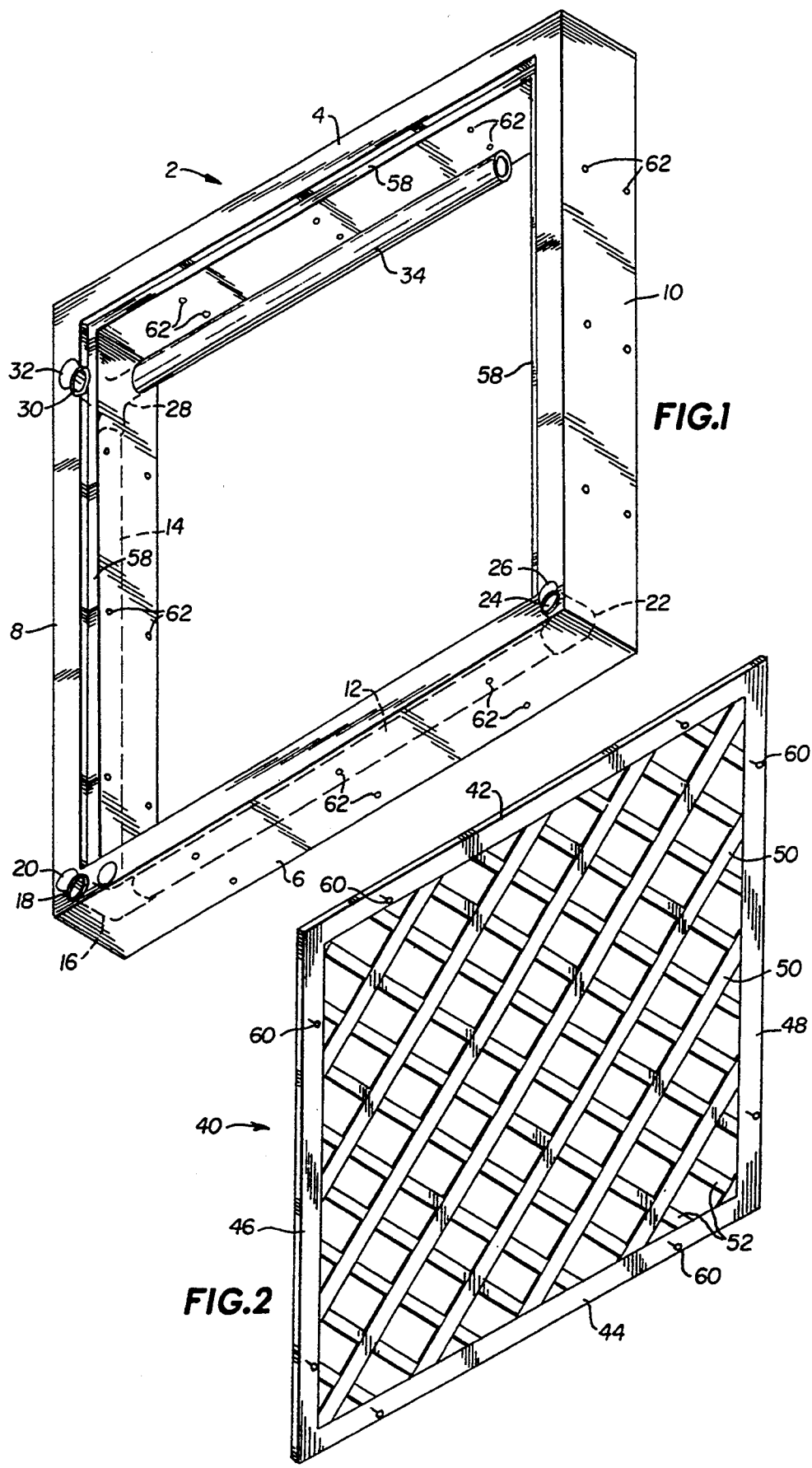

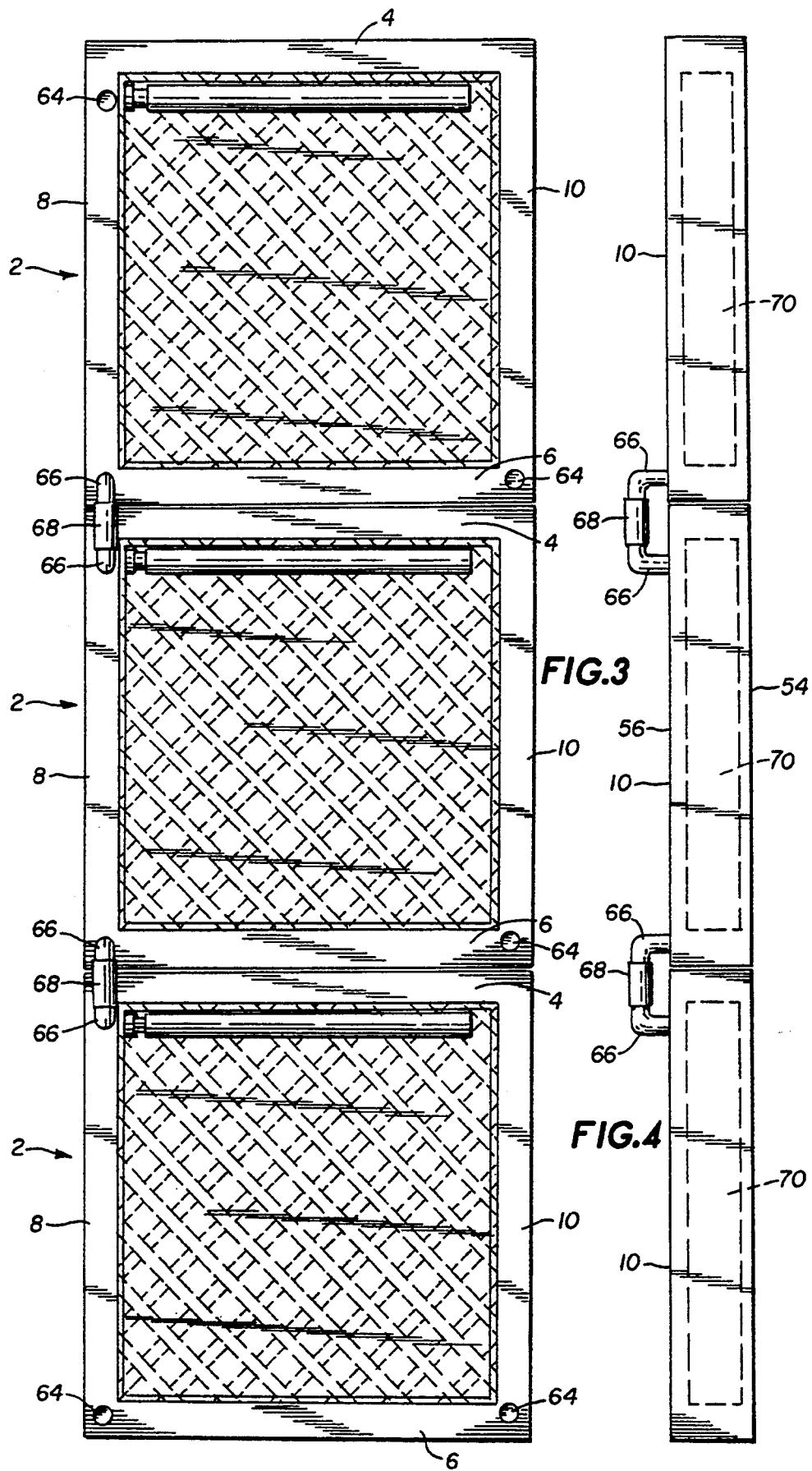

VEGETATION STRUCTURES

FIELD OF THE INVENTION

This invention relates generally to vegetation structures and more particularly to a modular system for use in vegetative purposes.

1. Background of the Invention

There have been many different structures used for vegetative purposes. In U.S. Pat. No. 4,268,994 there is disclosed structures for planters wherein the flowers or plants project horizontally from a vertically extending planter. Structures are also provided so that the planters can be hung at various locations in the household. In U.S. Pat. Nos. 2,121,173, 2,113,523, and 2,279,735, there are disclosed various vegetation bearing structures that are used for various purposes.

2. Brief Description of the Invention

This invention provides a decorative wall formed from a plurality of modules, each of which is provided with means for holding a compost unit, conduits, coupling and watering means so that the modules may be interconnected and watered from the one source.

In a preferred embodiment of the invention, each module comprises a closed framework comprising a plurality of sides forming an opening. The closed framework has a front side portion and a back side portion. At least one conduit is located in at least two of the plurality of sides. A plurality of coupling means are provided and each of the coupling means has at least one outlet facing the back side portion and extending in a direction substantially perpendicular thereto. Another coupling means joins together the conduit means in adjacent modules to permit fluid flow therebetween. Holding means are provided for holding a compost unit in the opening. Watering means are provided for supplying water to the compost unit. The sides of the closed framework have a top wall portion, a bottom wall portion and two opposite sidewall portions. One of the conduits is located in the bottom wall portion and the other of the conduits is located in one of the sidewall portions. The plurality of coupling means comprise first coupling means located at the intersection of the bottom wall portion and one of the sidewall portions; second coupling means located at the intersection of said bottom wall portion and the other of said sidewall portions, and third coupling means located at the intersection of said top wall portion and said other of said sidewall portions. The conduits and at least portions of the first, second and third coupling means are located in portions of the closed framework. Each module preferably has a square cross-sectional configuration with the outside length of each side being between about 18 and 36 inches and preferably about 24 inches. The inside length of each of the sides is preferably between about 15 and 33 inches and preferably about 21 inches. Each conduit is formed from a plastic material, such as polyvinylchloride or other materials having similar characteristics and preferably has an inner diameter between about 0.5 and 0.75 inch and preferably about 0.5 inch. The couplings are dimensioned to fit the conduits.

The holding means comprise a recessed portion in each of the sides of the front side portion and the back side portion extending outwardly from the opening. A front side lattice work is located in the recessed portions of the front side portions and a back side lattice work is located in the recessed portions of said back side portion. Securing means are provided for securing the front side lattice work and the back side lattice work in the recessed portions.

The watering means comprise a soaker hose connected to one of the conduits and extending in a direction parallel to the top wall portion. The soaker hose is located adjacent to but spaced from the top wall portion. The soaker hose preferably is that marketed by Aqua Pore Moisting Systems under the trade designation Aqua Pore Poreus Type in sizes 0.50 to 0.625.

A decorative wall is formed by joining together a plurality of the modules. Connecting means are provided for connecting at least one of the plurality of coupling means of each of the plurality of modules to at least another of the plurality of coupling means of another of the plurality of modules to permit fluid flow through the plurality of modules. All of the components of the module except for the compost unit and soaker hose are preferably formed from a plastic material.

BRIEF DESCRIPTION OF THE DRAWINGS

An illustrative embodiment of the invention is illustrated in the accompanying drawing in which:

FIG. 1 is a perspective view of a portion of a module of the invention;

FIG. 2 is a perspective view of a lattice work for use in the invention;

FIG. 3 is a back elevational view of a plurality of interconnected modules; and

FIG. 4 is a side elevational view of FIG. 3.

DETAILED DESCRIPTION OF THE INVENTION

In FIG. 1, there is illustrated a module 2 having a top wall 4, a bottom wall 6 and opposite sidewalls 8 and 10. A conduit 12 is located in the bottom wall 6 and a conduit 14 is located in the sidewall 8. The conduits 12 and 14 are joined together by a coupling 16 which has an internally threaded extension 18. The conduits 12 and 14 are joined to the coupling 16 by any conventional means. An opening 20 is formed at the juncture of the bottom wall 6 and the sidewall 8 and is in alignment with the internally threaded extension 18. Another coupling 22 is joined to the conduit 12 and has an internally threaded extension 24. An opening 26 is formed at the juncture of the bottom wall 6 and the sidewall 10 and is in alignment with the internally threaded extension 24. Another coupling 28 is joined to the conduit 14 and has an internally threaded extension 30. An opening 32 is formed at the juncture of the top wall 4 and the sidewall 8 and is in alignment with the internally threaded extension 30. A soaker hose 34 is joined to the coupling 28 by conventional means and extends parallel to but spaced from the top wall 4. Each of the top wall 4, the bottom wall 6 and the sidewalls 8 and 10 can be formed by a rectangularly shaped hollow plastic extrusion. In another embodiment, they can be formed by plastic molding around the conduits and couplings so that the conduits and the couplings are embedded therein. Each module preferably has a square cross-sectional configuration with the outside length of each side being between about 18 and 36 inches and preferably about 24 inches. The inside length of each of the sides is preferably between about 15 and 33 inches and preferably about 21 inches. Each conduit is formed from a plastic material, such as polyvinylchloride or other materials having similar characteristics and preferably has an inner diameter between about 0.5 and 0.75 inch and preferably about 0.5 inch. The couplings are dimensioned to fit the conduits.

A lattice work 40 is illustrated in FIG. 2 and has a top wall 42, a bottom wall 44 and opposite sidewalls 46 and 48. A plurality of superposed, spaced apart slats 50 and 52 are integral with the top wall 42, the bottom wall 44 and the opposite sidewalls 46 and 48. The module 2 has a front side 54 and a back side 56, FIG. 4. Each of the top wall 4, bottom wall 6 and opposite sidewalls 8 and 10 have recessed portions 58 in the front side 54 and the back side 56 dimensioned to accommodate the lattice work 40 which is formed from a suitable plastic material. The lattice work 40 may be secured in the recessed portions 58 using screws 60.

An assembly of three modules 2 is illustrated in FIGS. 3 and 4. The modules may be secured together using screws (not shown) in the openings 62 in the top wall 4 and bottom wall 6. Similar openings are formed in the opposite sidewalls 8 and 10. Conventional plugs 64 are threaded into the internally threaded extensions 26 and 30. An L-shaped coupling 66 is threaded into the internally threaded extensions 18 and 30. A hose 68 connects the adjacent ends of the L-shaped couplings 66. A compost unit 70 is located between the front and back lattice work 40.

When it is desired to use the stacked modules 2 of FIG. 3, one of the bottom plugs 64 is removed and a hose coupling (not shown) is threaded into the internally threaded opening 18 and the other end of the hose is connected to a source of water with or without fertilizers or other chemical treatments. The water flows through the conduits 14 and the L-shaped couplings 66 and hoses 68 and seeps out of the soaker hoses 34 into the compost units 70. If used indoors, the bottom module 2 would be located in a tray (not shown).

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A module for use in vegetative purposes comprising:
   a closed framework comprising a plurality of sides forming an opening;
   said closed framework having a front side portion, a back side portion and a top wall portion;
   at least one conduit associated with at least two of said plurality of sides;
   a plurality of coupling means having at least one outlet facing said back side portion and extending in a direction substantially perpendicular thereto;
   at least one of said plurality of coupling means joining together said conduit to permit fluid flow therebetween;
   holding means for holding a compost unit in said opening; and
   watering means associated with one of said conduits for supplying water to said compost unit.

2. A module as in claim 1 wherein:
   said closed framework further comprises, a bottom wall portion and two opposite sidewall portions;
   one of said conduits located in said bottom wall portion; and
   another of said conduits being located in one of said sidewall portions.

3. A module as in claim 2 wherein said plurality of coupling means comprise:
   first coupling means located at the intersection of said bottom wall portion and one of said sidewall portions;
   second coupling means located at the intersection of said bottom wall portion and the other of said sidewall portions; and
   third coupling means located at the intersection of said top wall portion and said other of said sidewall portions.

4. A module as in claim 3 wherein:
   said conduits and at least portions of said first, second and third coupling means are embedded in portions of said closed framework.

5. A module as in claim 1 wherein said holding means comprises:
   a recessed portion in each of said sides of said front side portion and said back side portion extending outwardly from said opening;
   a front side lattice work located in the recessed portions of said front side portion;
   a back side lattice work located in the recessed portions of said back side portion; and
   securing means for securing said front side lattice work and said back side lattice work in said recessed portions.

6. A module as in claim 1 wherein said watering means comprises:
   a soaker hose connected to one of said conduits and extending in a direction parallel to and spaced from said top wall portion.

7. A module as in claim 6 wherein:
   said closed framework further comprising a bottom wall portion and two opposite sidewall portions;
   one of said conduits located in said bottom wall portion; and
   another of said conduits being located in one of said sidewall portions.

8. A module as in claim 7 wherein said plurality of coupling means comprise:
   first coupling means located at the intersection of said bottom wall portion and one of said sidewall portions;
   second coupling means located at the intersection of said bottom wall portion and the other of said sidewall portions; and
   third coupling means located at the intersection of said top wall portion and said other of said sidewall portions.

9. A module as in claim 1 wherein:
   said module having a square cross-sectional configuration with the outside length of each side being between about 18 and 36 inches and the inside length of each side being between about 15 and 33 inches.

10. A module as in claim 1 wherein:
    said module having a square cross-sectional configuration with the outside length of each side being about 24 inches and the inside length of each side being about 21 inches.

11. A module as in claim 9 wherein said holding means comprises:
    a recessed portion in each of said sides of said front side portion and said back side portion extending outwardly from said opening;
    a front side lattice work located in the recessed portion of said front side portions;

a back side lattice work located in the recessed portions of said back side portion; and securing means for securing said front side lattice work and said back side lattice work in said recessed portions.

12. A decorative wall comprising:
a plurality of modules extending in at least a vertical direction;
each of said modules comprising:
a closed framework comprising a plurality of sides forming an opening;
said closed framework having a front side portion, a back side portion and a top wall portion;
at least one conduit associated with at least two of said plurality of sides;
a plurality of coupling means having at least one outlet facing said back side portion and extending in a direction substantially perpendicular thereto;
at least one of said plurality of coupling means joining together said conduit to permit fluid flow therebetween;
holding means for holding a compost unit in said opening means;
watering means associated with one of said conduits for supplying water to said compost unit; and
connecting means for connecting at least one of said plurality of coupling means of each of said plurality of modules to at least another of said plurality of coupling means of another of said plurality of modules to permit fluid flow therebetween.

13. A decorative wall as in claim 12 wherein:
said closed framework comprises a top wall portion, a bottom wall portion and two opposite sidewall portions;
one of said conduits located in said bottom wall portion; and
another of said conduits being located in one of said sidewall portions.

14. A decorative wall as in claim 13 wherein each of said plurality of coupling means comprise:
first coupling means located at the intersection of said bottom wall portion and one of said sidewall portions;
second coupling means located at the intersection of said bottom wall portion and the other of said sidewall portions; and
third coupling means located at the intersection of said top wall portion and said other of said sidewall portions.

15. A decorative wall as in claim 12 wherein said watering means comprises:
a soaker hose connected to said another of said conduits and extending in a direction parallel to and spaced from said top wall portion.

16. A decorative wall as in claim 15 wherein:
each of said modules having a square-cross-sectional configuration with the outside length of each side being between about 18 and 36 inches and the inside length of each side being between about 15 and 33 inches.

17. A decorative wall as in claim 15 wherein:
said closed framework further comprising, a bottom wall portion and two opposite sidewall portions;
one of said conduits located in said bottom wall portion; and
another of said conduits being located in one of said sidewall portions.

18. A decorative wall as in claim 17 wherein said plurality of coupling means comprise:
first coupling means located at the intersection of said bottom wall portion and one of said sidewall portions;
second coupling means located at the intersection of said bottom wall portion and the other of said sidewall portions; and
third coupling means located at the intersection of said top wall portion and said other of said sidewall portions.

19. A decorative wall as in claim 18 wherein:
said conduits and at least portions of said first, second and third coupling means are embedded in portions of said closed framework.

20. A decorative wall as in claim 19 wherein said holding means comprises:
a recessed portion in each of said sides of said front side portion and said back side portion extending outwardly from said opening;
a front side lattice work located in the recessed portions of said front side portion;
a back side lattice work located in the recessed portions of said back side portion; and
securing means for securing said front side lattice work and said back side lattice work in said recessed portions.

* * * * *